(12) United States Patent
Chilton et al.

(10) Patent No.: US 7,650,999 B2
(45) Date of Patent: Jan. 26, 2010

(54) END CAP AND GASKET ASSEMBLIES FOR FILTER ELEMENTS

(75) Inventors: Donald Troy Chilton, Gastonia, NC (US); Jason Lamarr Tate, Bessemer City, NC (US)

(73) Assignee: Wix Filtration Corp LLC, Gastonia, NC (US)

( * ) Notice: Subject to any disclaimer, the term of this patent is extended or adjusted under 35 U.S.C. 154(b) by 318 days.

(21) Appl. No.: 11/483,453

(22) Filed: Jul. 10, 2006

(65) Prior Publication Data

US 2006/0249443 A1 Nov. 9, 2006

Related U.S. Application Data

(62) Division of application No. 10/319,578, filed on Dec. 16, 2002, now abandoned.

(51) Int. Cl.
*B29C 69/00* (2006.01)
(52) U.S. Cl. .................. 210/493.2; 264/241; 264/250; 55/DIG. 5
(58) Field of Classification Search .................. 55/502, 55/DIG. 5; 264/259, 262, 241, 250; 210/493.2
See application file for complete search history.

(56) References Cited

U.S. PATENT DOCUMENTS

| | | | |
|---|---|---|---|
| 3,106,528 A | 10/1963 | Burks | |
| 3,395,208 A | 7/1968 | Witchell | |
| 4,078,036 A | 3/1978 | Keefer | |
| 4,609,465 A | 9/1986 | Miller | |
| 4,882,055 A | 11/1989 | Stamstad | |
| 4,934,668 A | 6/1990 | Vassmer | |
| 5,059,374 A | 10/1991 | Krueger et al. | |
| 5,472,537 A | 12/1995 | Friel et al. | |
| 5,484,466 A | 1/1996 | Brown et al. | |
| 5,556,440 A * | 9/1996 | Mullins et al. | ................. 55/498 |
| 5,685,985 A * | 11/1997 | Brown et al. | ................. 210/450 |
| 5,695,702 A | 12/1997 | Niermeyer | |
| 5,906,136 A | 5/1999 | Yabe et al. | |
| 5,916,435 A | 6/1999 | Spearman et al. | |
| 5,954,849 A * | 9/1999 | Berkhoel et al. | ............. 55/498 |
| 5,961,155 A | 10/1999 | Youngs | |
| 6,030,531 A | 2/2000 | Gershenson | |
| 6,159,261 A | 12/2000 | Binder et al. | |
| 6,447,567 B1 * | 9/2002 | Ehrenberg | .................. 55/498 |
| 2004/0075221 A1 * | 4/2004 | Gershenson et al. | ........ 277/628 |

* cited by examiner

*Primary Examiner*—Terry K Cecil
(74) *Attorney, Agent, or Firm*—Honigman Miller Schwartz and Cohn LLP

(57) ABSTRACT

A filter element is particularly suitable as a "green" filter element because all of its parts are flammable for disposal of after use by incineration. The filter element has an annular pleated filter media, hard resinous end seals and compressible gaskets bonded directly to the end seals. In accordance with one embodiment, both the end seals and gaskets are applied to the ends of the filter media by sequential steps in an injecting molding machine. In accordance with another embodiment, the gasket is molded to the end cap to form an integral assembly and the end cap is then fixed to the filter media by adhesive or by heat bonding.

8 Claims, 4 Drawing Sheets

END CAP AND GASKET ASSEMBLIES FOR FILTER ELEMENTS

This application is a divisional application of U.S. patent application Ser. No. 10/319,278, filed Dec. 16, 2002, now abandoned.

FIELD OF THE INVENTION

The present invention is directed to improvements in end cap and gasket assemblies for filter elements, and more particularly, to techniques for securing end caps and gaskets to one another and to filter media.

BACKGROUND OF THE INVENTION

Green filter elements are filter elements comprised of flammable components allowing the filter elements to be disposable by incineration after use. Green filter elements do not contain metal components. Since by law, used lubricating oil from internal combustion engines is 100% recycled, it is also now becoming the practice to recycle lubricating oil filters by completely incinerating used filter elements including the oil trapped therein. Preferably, there is no waste other than ash. Consequently, filters such as cartride filters, now completely avoid metal components.

Cartride filters currently use an injected end cap to seal the ends of annular filter media and a felt gasket which is adhered to the end cap with adhesive. This is a two step process which results in increased cost due to extended production time, manual handling of filter elements and questionable seal quality. Since filter elements are produced by the millions, relatively slight reductions in cost per unit can result in substantial production savings which in turn further encourage the production of "green" filter elements, thus reducing the environmental burden of filter elements.

SUMMARY OF THE INVENTION

In view of the aforementioned considerations, the present invention is directed to a filter element comprising a pleated annular filter media of flammable material having a first end and a second end. An end cap of relatively hard, resinous, flammable material is molded integral with at least one of the ends of the pleated annular filter media and an annular gasket of relatively soft resinous material, which is also flammable, is molded directly onto the relatively hard end cap so as to provide a filter element which is disposable after use by incineration. In more specific aspects of the invention, the hard resinous material is NYLON® (polyamide) or polypropylene and the gasket is rubber.

In alternative embodiments, the end cap is heat sealed or attached with an adhesive to one or both ends of the pleated annular filter media.

The present invention is also directed to a process for producing a filter element wherein the process comprises mounting a pleated annular filter media of flammable material in an injection molding machine having outlets for resinous material aligned with at least one end of the filter media. An amount of hardenable, flammable resinous material is injected into the ends of the annular pleated filter media to form end caps that seal the ends of the filter media, the hardenable resinous material having after it is injected, end surfaces which face axially with respect to the filter media. Annular deposits of flammable gasket material are then injected directly onto the end surfaces of the end caps, the gasket material forming a bond with the hardenable flammable resinous material of the end caps, whereby a filter element is provided which is disposable after use by incineration.

In a further aspect of the process, the hardenable resinous material is NYLON® or polypropylene and the gasket material is nitrile rubber.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1A:
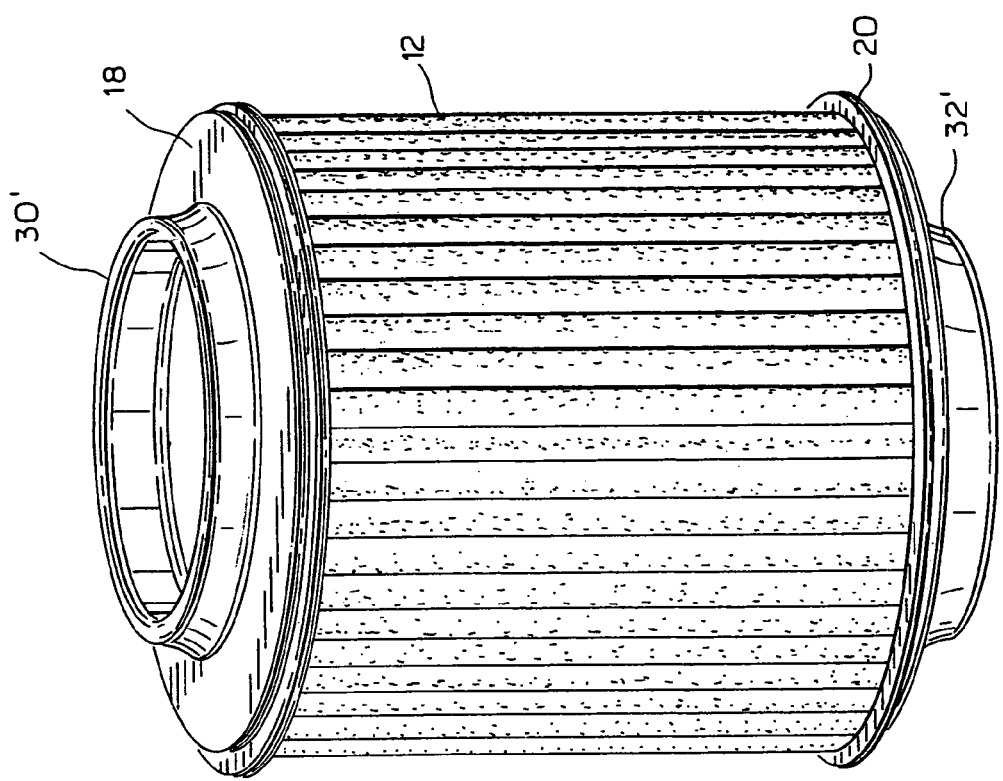
FIG. 1A is a side perspective view of a first embodiment of a filter element configured in accordance with the principles of the present invention.

Referring now to FIG. 1A, there is shown a filter element 10 configured in accordance with the principles of the present invention, wherein the filter element comprises an annular pleated filter media 12 having first and second ends 14 and 16 respectively, which ends are sealed by first and second end caps 18 an 20 respectively. The end caps 18 and 20 prevent fluid, such as for example, lubricating oil from flowing out of the first and second ends 14 and 16, respectively of the filter media 12. The end caps 18 and 20 are annular to leave access to a hollow core 24 within the filter media 12 so that fluid passing radially through the filter media 12 in either direction has an outlet or inlet. The end caps 18 and 20 have axially facing exposed surfaces 26 and 28 which face away from the filter media 12. Bonded directly to the axially facing end surfaces 26 and 28 are gaskets 30 and 32, respectively.

The seals 18 and 20 are made of a material such as NYLON® or polypropylene which is relatively hard and inflexible upon setting, whereas the gaskets 30 and 32 are made of a compressible and deformable elastic material, such as nitrile rubber, which deforms upon abutting a surface with which it must seal.

Figure 1B:
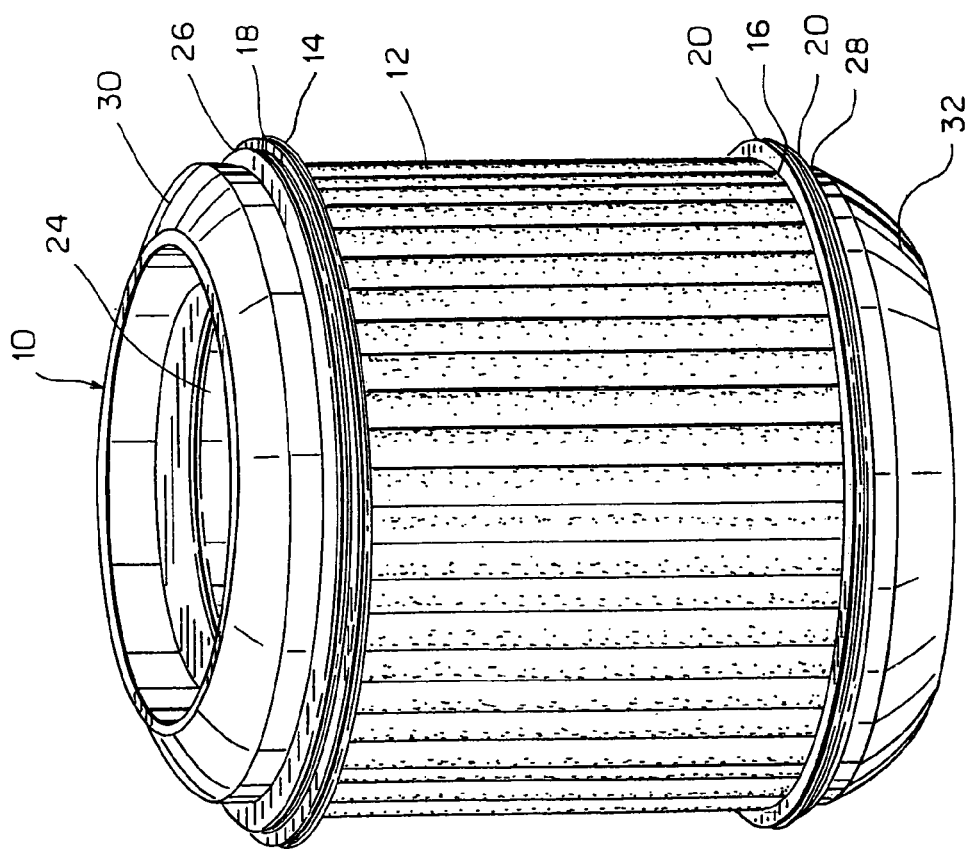
FIG. 1B is a side perspective view of a second embodiment of a filter element configured in accordance with the present invention.
Figure 2:
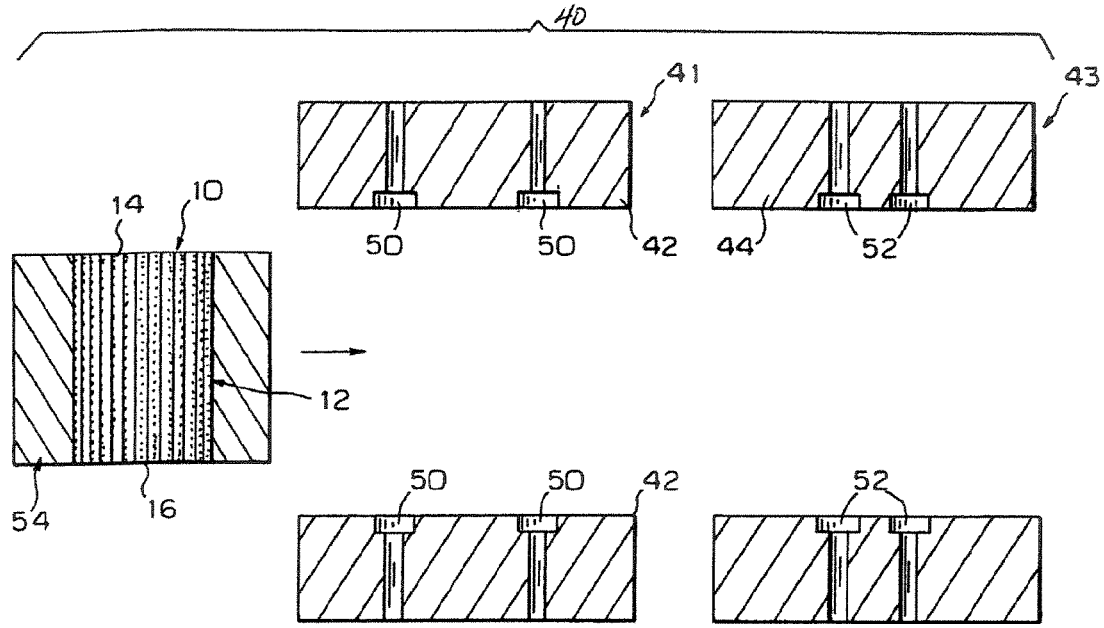
FIG. 2 is a side view showing an annular pleated filter media disposed for alignment with a first station an injection molding machine arrangement prior to injecting relatively hard material for end caps and ejecting relatively soft material for gaskets.

FIG. 1B discloses a second embodiment of the invention wherein gaskets 30' and 32' have a smaller radial width than the gaskets 30 and 32 of FIG. 1A. In both embodiments, the gaskets are molded directly to the end caps 18 and 20.

The aforediscussed three components of the filter element 10, i.e. the filter media 12, the end caps 18 and 20 and the gaskets 30 and 32 are flammable. Accordingly, after use, when the filter media 12 is saturated with oil, the entire filter element 10 can be incinerated in a facility such as a steam generating power plant to destroy the residual lubricating oil so that the oil does not contaminate the soil or ground water, which is a possibility if the filter element is disposed of in a landfill.

Referring now to FIGS. 2-5, an arrangement 40 of injection molding machines has a first station 41 with first injection heads 42 for injecting hardenable sealing materials into the first ends 14 and 16 of the filter media 12 and a second station 43 with second injection heads 44 for subsequently molding gasket materials onto the end caps 18 and 20 formed by the hardenable sealing materials of the annular pleated filter media. The heads 42 each have an annular opening 50 for injecting material, such as NYLON® (polyamide) or polypropylene, into the ends 14 and 16 of the filter media 12 and the heads 44 each have an annular head 52 for molding the annular ring of gasket material, such as nitrile rubber, onto the seals. The filter media 12 is restrained within a surrounding support 54 as it is indexed through the injection molding arrangement 40.

Figure 3:
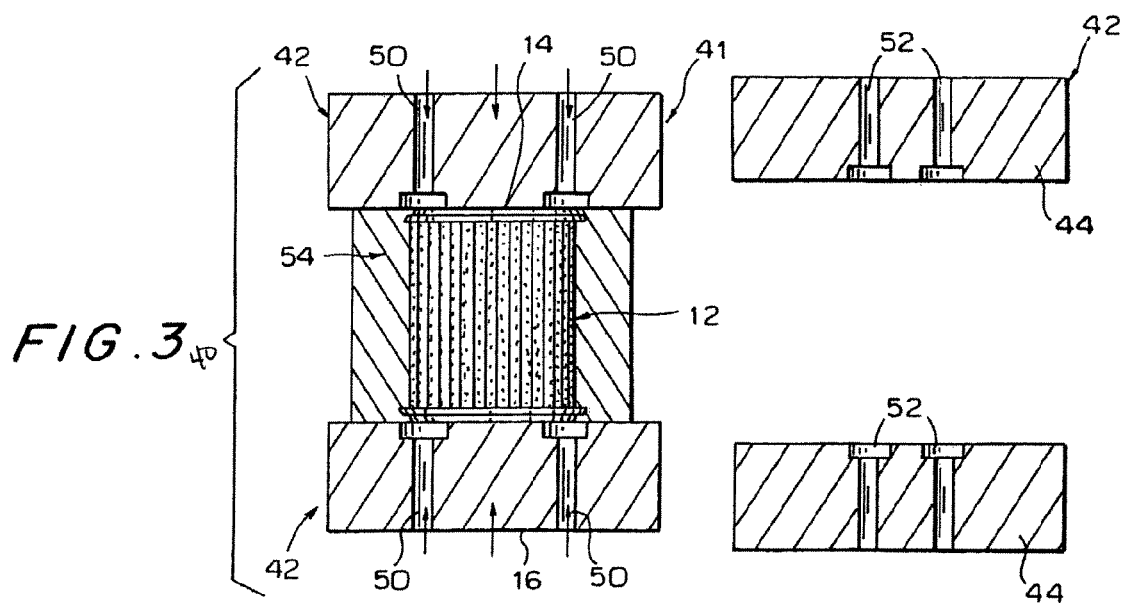
FIG. 3 is a side view similar to FIG. 2 showing sealing material being injected by the injection molding machine into the ends of the annular pleated filter media to form end caps.

As is seen in FIG. 3, the heads 42 first inject material for the annular end caps 18 and 20 into the ends 14 and 16 of the filter media 12 to seal the ends of the filter media. The first molding openings 50 are configured to produce end caps 18 and 20 with the flat surfaces 26 and 28.

Figure 4:
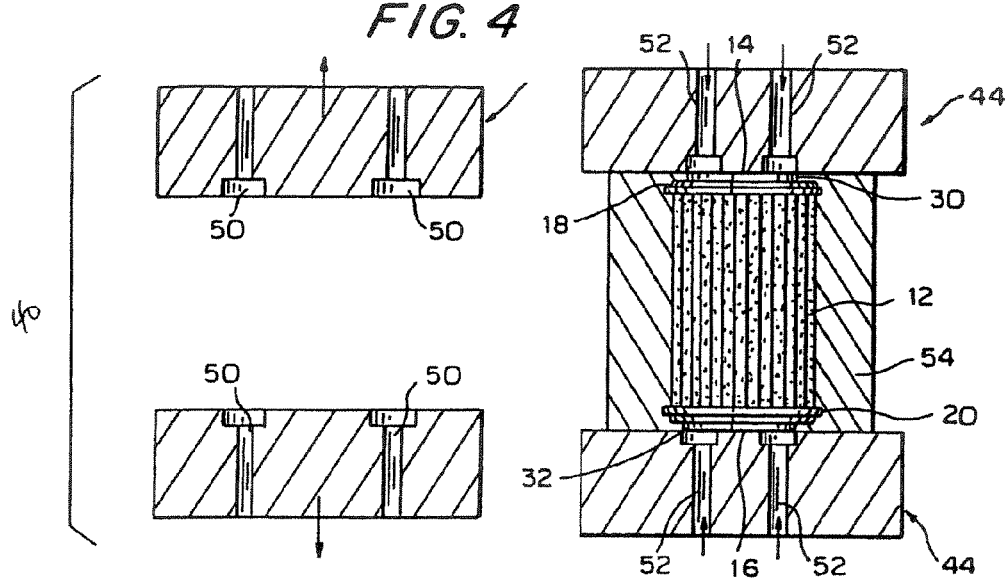
FIG. 4 is a side view showing gaskets being molded by the injection molding machine onto the end caps.
Figure 5:
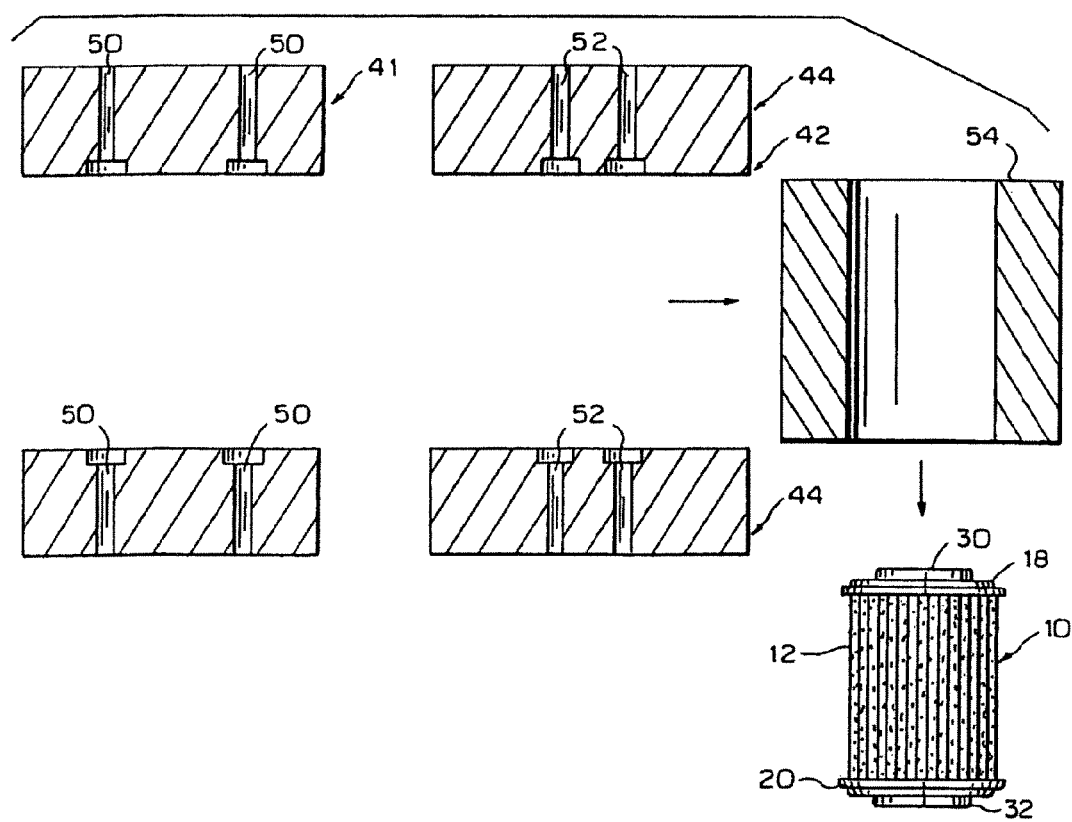
FIG. 5 is a side view showing the completely formed filter element being ejected from its support which has been indexed through the injection molding machine assembly.
Figure 6:
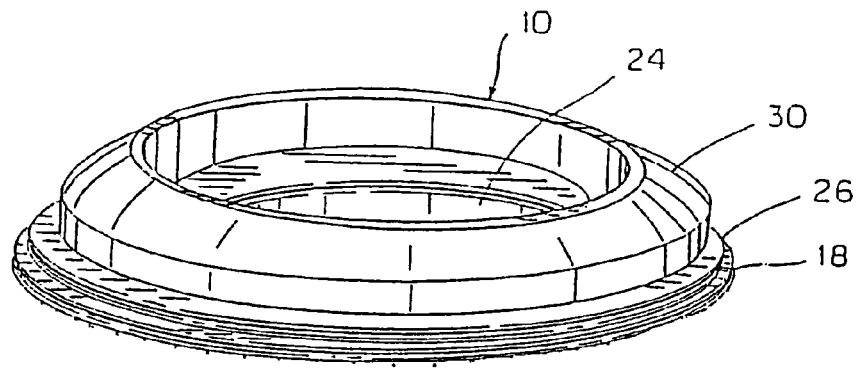
FIG. 6 is a perspective view of a third embodiment of an end cap and gasket arrangement according to the present invention.
Figure 7:
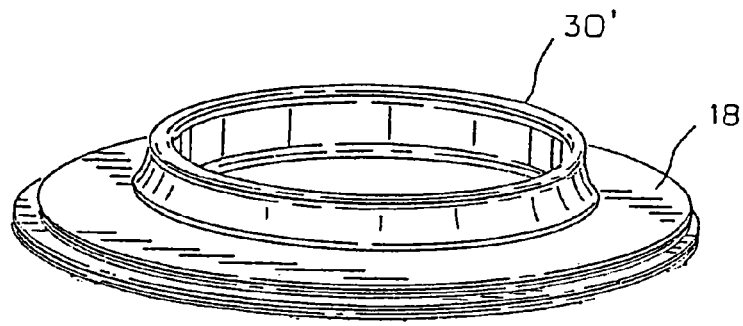
FIG. 7 is a perspective view of a fourth embodiment of an end cap and gasket arrangement according to the present invention.

Referring now to FIG. 4, after the first molding opening 50 form the end caps 18 and 20, the second molding openings 52 eject a soft material such as nitrile rubber for the gaskets 28 and 30 onto the flat surfaces 26 and 28 of the end caps. The material forming the gaskets 30 and 32 bonds with the material of the end caps 26 and 28 so that the gaskets are adhered to the end caps to form an integral structure which is leak proof and reliable. As seen in FIG. 5, the molding machine 40 then ejects the now complete filter element 10 axially from the support 54 in a form ready for shipment to customers.

The two-shot molding process for the end caps 18 and 20 and the gaskets 30 and 32 can be done in three ways, the first being to have a first horizontal molding machine for injecting the material for the end cap 18 and a second horizontal machine, next to the first machine for ejecting the material for the gaskets 30 and 32 with the filter media 12 being indexed from one machine to the next and then ejected from the line as a complete filter element 10. The second way is to have the material for the end caps 18 and 20 injected horizontally from a horizontal molding machine and the material for the gasket 30 and 32 ejected vertically from a vertical molding machine. The third way is to have both molding machines oriented vertically.

While FIGS. 2-5 show the end caps 18 and 20 and gaskets 30 and 32 being formed simultaneously on both ends of the filter media 12, this injection molding operation may be performed by molding end caps and gaskets on the first end 14 of the filter media 180° and then forming end caps and gaskets on the second end 16 of the filter media.

Alternatively, a separate set of injection molding machines can be in tandom with a first set of machines to mold end caps and gaskets on the second end of the filter media 12.

The process illustrated in FIGS. 2-5 produces complete filter elements 10 in two hands-off steps which is a faster and substantially more efficient process than the present practice of hot plate welding end caps to the ends of the filter media 12, and then gluing gaskets thereto.

Referring now to FIGS. 6-9, a third and fourth embodiment of the invention molds the gaskets 30 and 30' respectively to the end cap 18 prior to molding the end cap to the filter media 12 so as to form an integral end cap/gasket assembly 70. The end cap/gasket assembly 70 is then fixed to the ends 14 and 16 of the filter media 12 by adhesive or heat sealing (hot plate welding) to form a "green" filter element. As with the first and second embodiments of FIGS. 1A and 1B, the gaskets 30 and 30' are preferably made of a rubber material, such as nitrile rubber, while the end caps 18 are made of a resinous material which after molding is hard. Preferable materials for the end cap 18 are polypropylene or polyamide materials.

Figure 8:
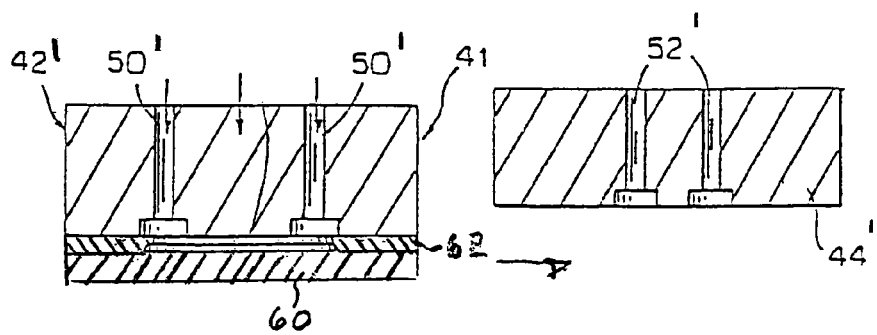
FIG. 8 is a side elevation of a portion of an injection molding machine for producing the end cap of FIGS. 6 and 7.
Figure 9:
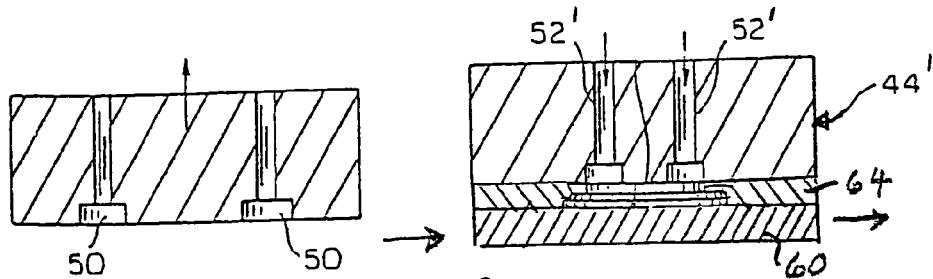
FIG. 9 is a side elevation of an injection molding machine for molding a gasket onto the end cap of FIG. 8.

FIG. 8 discloses molding of an end cap 18 wherein a material such as NYLON® (polyamide) is ejected into a die comprising a base plate 60 and a shaping die 62 from annular inlet 50' in a first injection head 42'. The molded end cap 18 is then indexed to a second injection head 44' (FIG. 9) where a soft material, such as rubber or nitrile rubber, is ejected by inlets 52' molded directly onto the end cap 18 in a configuration determined by a shaping die 64. Alternatively, both the material for the end cap 18 and the material for the gaskets 30 or 30' may be dispensed sequentially at the same molding machine station by moving the molding heads 42' and 44' or by combining the molding material inlets 50' and 52' in a single molding head. In still another approach, the end cap and gasket materials could by dispensed the same inlets.

From the foregoing description, one skilled in the art can easily ascertain the essential characteristics of this invention, and without departing from the spirit and scope thereof, can make various changes and modifications of the invention to adapt it to various usages and conditions.

We claim:

1. A process for producing a filter element having an annular pleated filter media, said process comprising:
   providing said annular pleated filter media;
   molding an annular deposit of hardenable resinous material onto the filter media forming an annular end cap to seal the filter media, the end cap having a flat surface and an opposite surface, said end cap defining an opening at a central portion thereof; and
   after the end cap is formed and begins to cure but before said end cap fully cures, molding an annular deposit of gasket material directly onto said flat surface of said end cap to form a gasket thereon, wherein the gasket material forms a direct adhesiveless bond with the hardenable resinous material.

2. The process of claim 1, further comprising the step of:
   securing the opposite side of the end cap to an end of the filter media such that the flat surface faces axially with respect to the filter media.

3. The process of claim 2, further comprising the step of:
   mounting the filter media in an injection molding machine, wherein an outlet of the molding machine is aligned with an tad of the filter media; and
   dispensing hardenable resinous material about an end of the filter media.

4. The process of claim 3, wherein the mounting step precedes the molding steps such that the end cap is dispensed directly upon the end of the filter media.

5. The process of claim 1, wherein the end cap and the gasket are injection molded.

6. A process for producing a filter element having an annular pleated filter media, said process comprising:

providing said annular pleated filter media;

molding an annular deposit of hardenable resinous material onto the filter media forming an annular end cap for sealing the filter media, the end cap having a flat surface and an opposite surface, said end cap defining an opening at a central portion thereof;

molding an annular deposit of gasket material;

combining said gasket material with said hardenable resinous material after the end cap is formed and begins to cure but before said gasket material and said hardenable resinous material are fully cured, wherein the gasket material forms, a direct adhesiveless bond with the hardenable resinous material.

7. The process of claim 6, further comprising the step of:

securing the opposite side of the end cap to an end of the filter media such that the flat surface faces axially with respect to the filter media.

8. The process of claim 6, further comprising the step of:

mounting the filter media in an injection molding machine, wherein an outlet of the molding machine is aligned with an end of the filter media; and dispensing said harden able resinous material about an end of the filter media.

* * * * *